(12) United States Patent
Yi et al.

(10) Patent No.: US 10,715,264 B2
(45) Date of Patent: Jul. 14, 2020

(54) METHOD AND APPARATUS FOR SUPPORTING RS-SINR MEASUREMENT IN WIRELESS COMMUNICATION SYSTEM

(71) Applicant: LG ELECTRONICS INC., Seoul (KR)

(72) Inventors: Yunjung Yi, Seoul (KR); Byounghoon Kim, Seoul (KR); Youngwoo Yun, Seoul (KR); Kijun Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/773,535

(22) PCT Filed: Nov. 14, 2016

(86) PCT No.: PCT/KR2016/013054
§ 371 (c)(1),
(2) Date: May 3, 2018

(87) PCT Pub. No.: WO2017/082703
PCT Pub. Date: May 18, 2017

(65) Prior Publication Data
US 2018/0323886 A1    Nov. 8, 2018

Related U.S. Application Data

(60) Provisional application No. 62/254,727, filed on Nov. 13, 2015.

(51) Int. Cl.
*H04B 17/336* (2015.01)
*H04B 1/10* (2006.01)
(Continued)

(52) U.S. Cl.
CPC ......... *H04B 17/336* (2015.01); *H04B 1/1027* (2013.01); *H04B 17/318* (2015.01);
(Continued)

(58) Field of Classification Search
CPC .. H04B 17/316; H04B 17/318; H04B 1/1027; H04L 5/0048; H04W 24/10; H04W 48/16
See application file for complete search history.

(56) References Cited

U.S. PATENT DOCUMENTS

2013/0344873 A1    12/2013  Sane et al.
2014/0328327 A1*   11/2014  Xiao ............... H04W 36/30
                                                    370/332
(Continued)

FOREIGN PATENT DOCUMENTS

WO         2015125775         8/2015

OTHER PUBLICATIONS

PCT International Application No. PCT/KR2016/013054 ,International Search Report dated Feb. 7, 2017, 2 pages.

*Primary Examiner* — Habte Mered
(74) *Attorney, Agent, or Firm* — Lee Hong Degerman Kang & Waimey

(57) ABSTRACT

A method and apparatus for performing reference signal signal-to-interference and noise ratio (RS-SINR) measurements in a wireless communication system is provided. A user equipment (UE) receives an indication of certain subframes for performing RS-SINR measurements from a network via a higher layer, and performs the RS-SINR measurements in the certain subframes.

15 Claims, 5 Drawing Sheets

(51) Int. Cl.
*H04B 17/318* (2015.01)
*H04L 5/00* (2006.01)
*H04W 24/10* (2009.01)
*H04W 48/16* (2009.01)

(52) U.S. Cl.
CPC .......... *H04L 5/0048* (2013.01); *H04W 24/10* (2013.01); *H04W 48/16* (2013.01)

(56) References Cited

U.S. PATENT DOCUMENTS

| | | | |
|---|---|---|---|
| 2015/0092768 A1* | 4/2015 | Ng | H04W 48/16 370/350 |
| 2015/0163008 A1 | 6/2015 | Kim et al. | |
| 2015/0264592 A1* | 9/2015 | Novlan | H04L 27/2601 370/252 |
| 2015/0312784 A1* | 10/2015 | You | H04L 1/0693 370/252 |
| 2016/0072598 A1* | 3/2016 | Jonsson | H04B 7/0413 455/67.11 |
| 2018/0227838 A1* | 8/2018 | Hayashi | |

* cited by examiner

[Fig. 1]
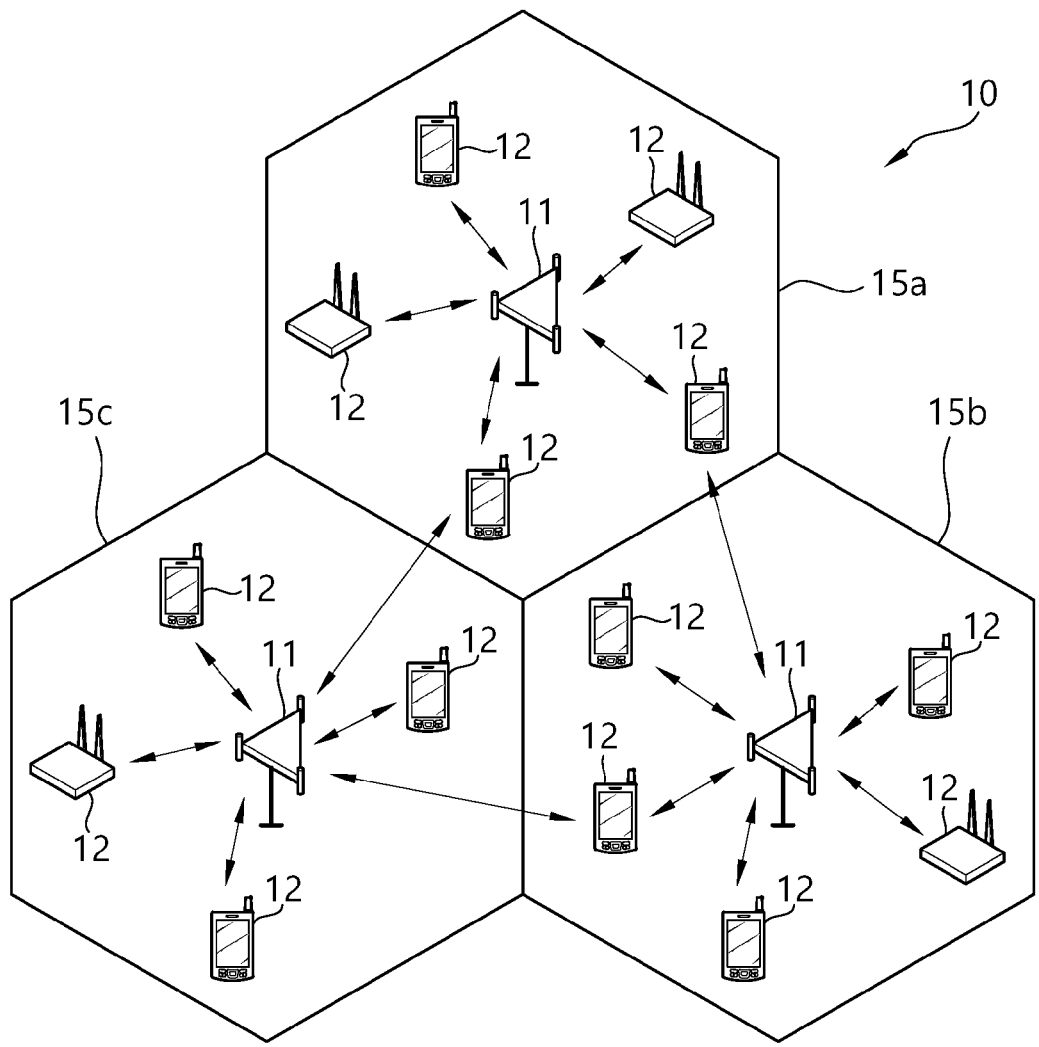
[Fig. 2]
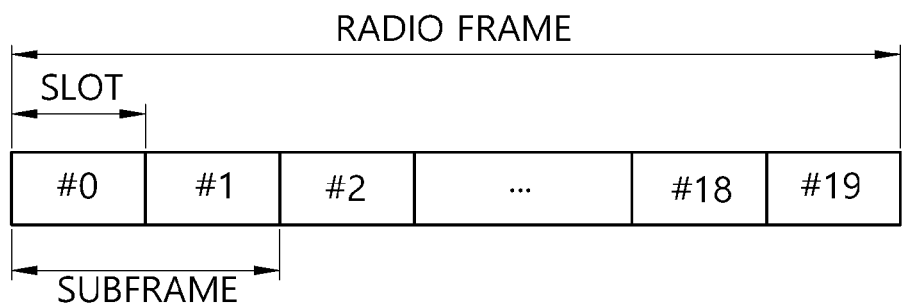

[Fig. 3]
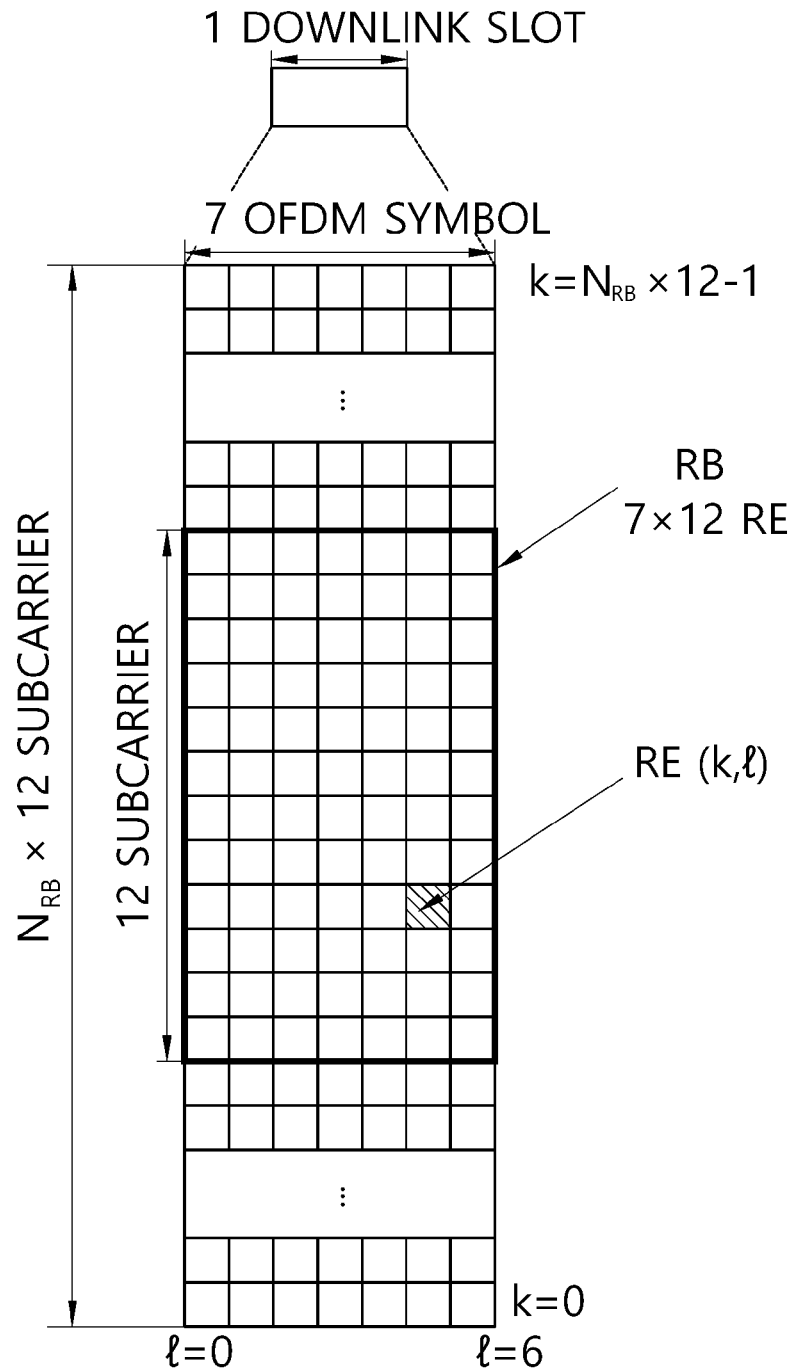

[Fig. 4]
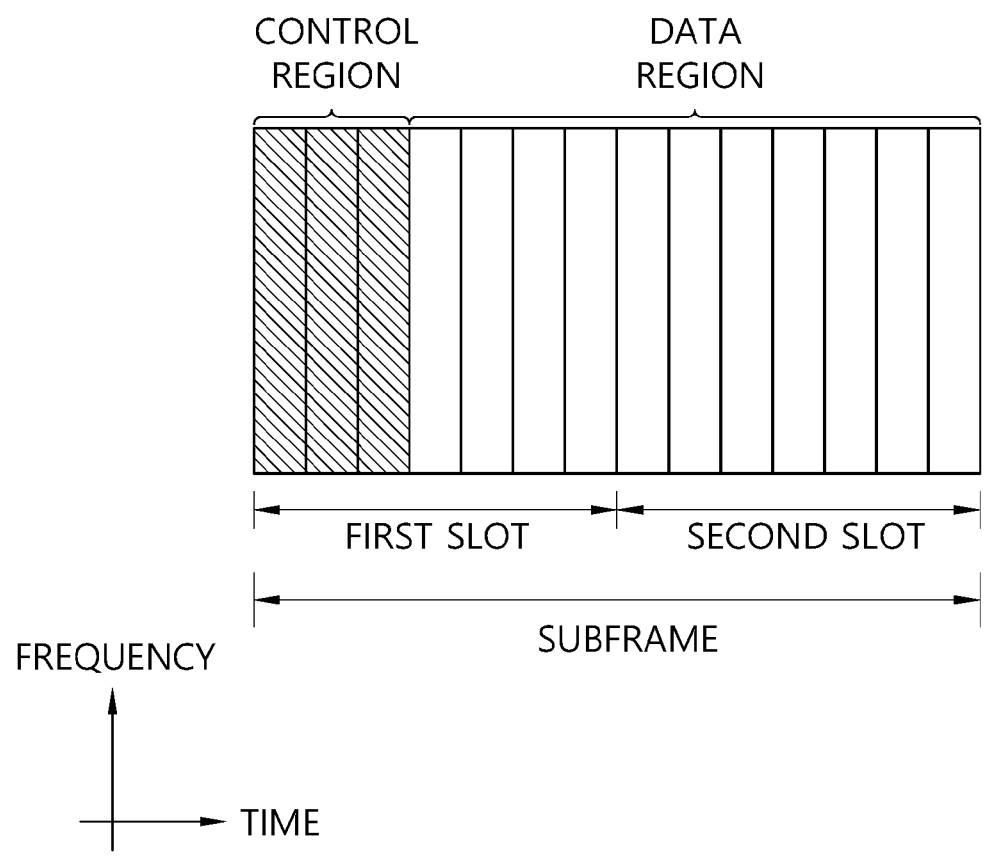

[Fig. 5]
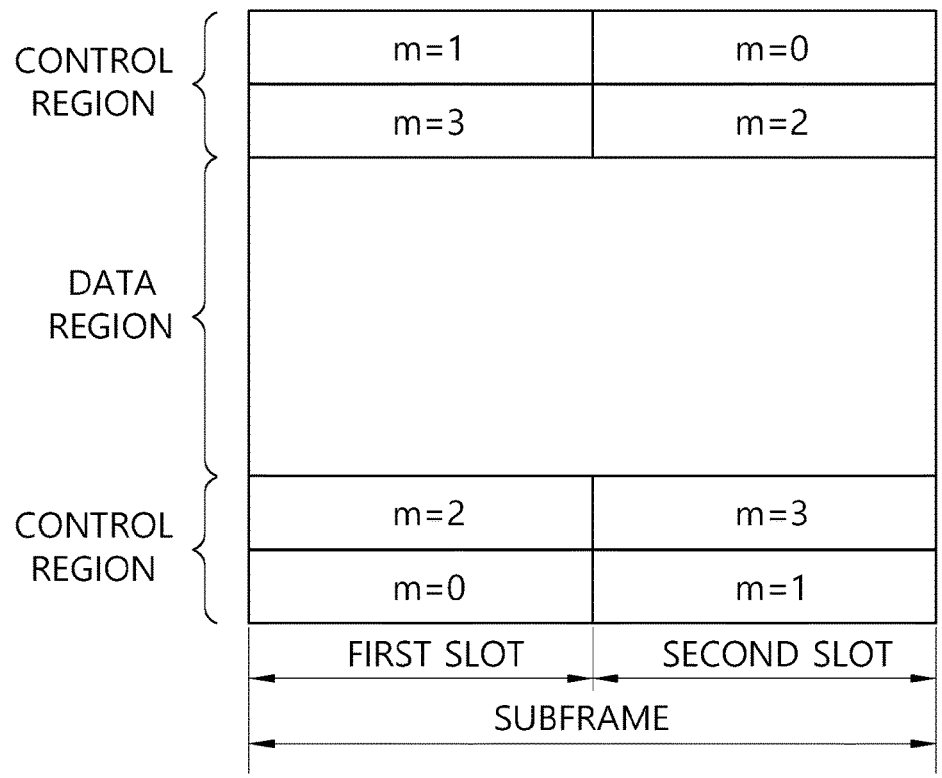
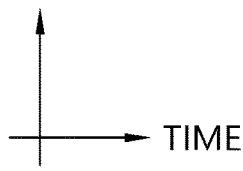
[Fig. 6]
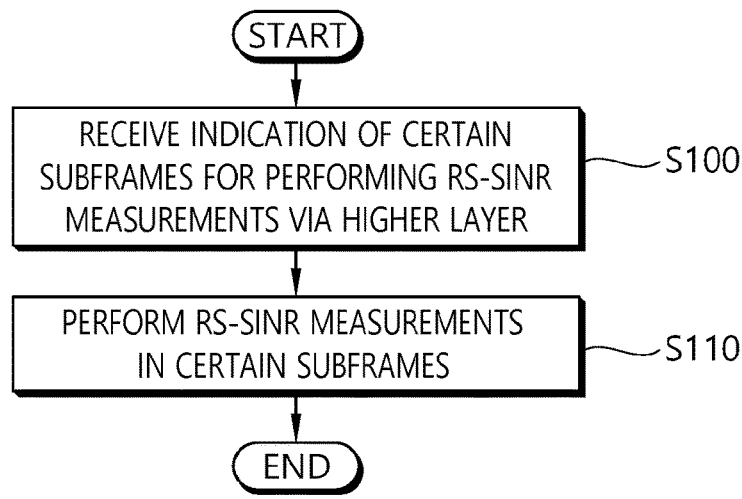

[Fig. 7]
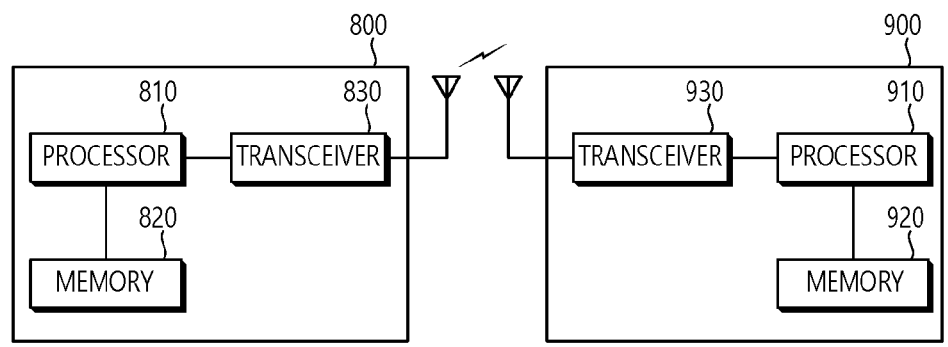

METHOD AND APPARATUS FOR SUPPORTING RS-SINR MEASUREMENT IN WIRELESS COMMUNICATION SYSTEM

CROSS-REFERENCE TO RELATED APPLICATIONS

This application is the National Stage filing under 35 U.S.C. 371 of International Application No. PCT/KR2016/013054, filed on Nov. 14, 2016, which claims the benefit of U.S. Provisional Application No. 62/254,727, filed on Nov. 13, 2015, the contents of which are all hereby incorporated by reference herein in their entirety.

BACKGROUND OF THE INVENTION

Field of the Invention

The present invention relates to wireless communications, and more particularly, to a method and apparatus for supporting a reference signal signal-to-interference and noise ratio (RS-SINR) measurement in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

For small cell enhancements, physical layer aspects have been discussed. Specifically in 3GPP LTE rel-12, when a number of small cells are deployed in a macro cell coverage, the feature of small cell on/off has been discussed, in order to reduce interference, which may occur since all small cells are turned on, and to increase user packet throughput (UPT) of a user equipment (UE). To support fast transition between on/off states of the small cell, various technologies have been studied, one of which is a discovery signals. The discovery signals may be called a discovery reference signal (DRS).

As the discovery signals are introduced, a method for performing measurements by using the discovery signals efficiently may be required.

SUMMARY OF THE INVENTION

The present invention provides a method and apparatus for supporting a reference signal signal-to-interference noise ratio (RS-SINR) measurement in a wireless communication system. The present invention provides a method and apparatus for measuring RS-SINR in enhanced inter-cell interference coordination (eICIC) and small cell on/off scenario.

In an aspect, a method for performing reference signal signal-to-interference and noise ratio (RS-SINR) measurements by a user equipment (UE) in a wireless communication system is provided. The method includes receiving an indication of certain subframes for performing RS-SINR measurements from a network via a higher layer, and performing the RS-SINR measurements in the certain subframes.

In another aspect, a user equipment (UE) in a wireless communication system is provided. The UE includes a memory, a transceiver, and a processor, coupled to the memory and the transceiver, that controls the transceiver to receive an indication of certain subframes for performing reference signal signal-to-interference and noise ratio (RS-SINR) measurements from a network via a higher layer, and performs the RS-SINR measurements in the certain subframes.

Efficient load distribution among multiple carriers can be possible by performing RS-SINR measurement.

BRIEF DESCRIPTION OF THE DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows a method for performing RS-SINR measurements by a UE according to an embodiment of the present invention.
FIG. 7 shows a wireless communication system to implement an embodiment of the present invention.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PC-FICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

The DL cell-specific reference signal (CRS) consist of known reference symbols inserted in the first and third last OFDM symbol of each slot for antenna port 0 and 1. There is one CRS transmitted per DL antenna port. The number of DL antenna ports for the transmission of CRS equals 1, 2, or 4.

Physical layer provides 504 unique cell identities using synchronization signal.

The DL multicast-broadcast single-frequency network (MBSFN) RS consist of known reference symbols inserted every other subcarrier in the 3rd, 7th and 11th OFDM symbol of subframe in case of 15 kHz subcarrier spacing and extended CP.

In addition to CRS and MBSFN RS, the physical layer supports UE-specific RS, positioning reference signal (PRS), channel state information reference signal (CSI-RS), and discovery signal (or, discovery reference signal (DRS)).

A UE may assume presence of the discovery signal consisting of CRS, primary and secondary synchronization signals, and configurable CSI-RS.

The eNB using cell on/off may adaptively turn the DL transmission of a cell on and off. A cell whose DL transmission is turned off may be configured as a deactivated secondary cell (SCell) for a UE. A cell performing on/off may transmit only periodic discovery signal and UEs may be configured to measure the discovery signal for radio resource management (RRM). Cell on/off may be performed for the purpose of e.g. inter-cell interference coordination and avoidance, load balancing, and energy saving, etc. The criteria used for cell on/off may be e.g. traffic load increase/decrease, UE arrival/departure (i.e. UE-cell association), and packet arrival/completion.

A UE performs RRM measurement and may discover a cell or transmission point of a cell based on discovery signal when the UE is configured with discovery-signal-based measurements.

Measurements to be performed by a UE for intra/inter-frequency mobility can be controlled by E-UTRAN, using broadcast or dedicated control. In radio resource control (RRC) idle state (RRC_IDLE), a UE shall follow the measurement parameters defined for cell reselection specified by the E-UTRAN broadcast. The use of dedicated measurement control for RRC_IDLE state is possible through the provision of UE specific priorities. In RRC connected state (RRC_CONNECTED), a UE shall follow the measurement configurations specified by RRC directed from the E-UTRAN (e.g. as in UTRAN MEASUREMENT_CONTROL).

Intra-frequency neighbor (cell) measurements and inter-frequency neighbor (cell) measurements are defined as follows:

Intra-frequency neighbor (cell) measurements: Neighbor cell measurements performed by the UE are intra-frequency measurements when the current and target cell operates on the same carrier frequency. The UE shall be able to carry out such measurements without measurement gaps.

Inter-frequency neighbor (cell) measurements: Neighbor cell measurements performed by the UE are inter-frequency measurements when the neighbour cell operates on a different carrier frequency, compared to the current cell. The UE should not be assumed to be able to carry out such measurements without measurement gaps.

To support efficient load distribution among multiple carriers, a method for performing a reference signal signal-to-interference and noise ratio (RS-SINR) measurements based on CRS may be proposed according to the present invention. For RS-SINR, at least one of the followings may be considered.

(1) Signaling for inter-frequency RS-SINR measurements and serving cell RS-SINR measurements may be introduced. Neighbor cell intra-frequency RS-SINR measurements may be considered as well.

(2) RS-SINR measurements may be generic for any RRM decision such as inter-frequency load balancing and handover decisions.

(3) Current measurement framework may be reused for RS-SINR measurements.

(4) Current events for reference signal received power (RSRP)/reference signal received quality (RSRQ) measurements may be reused. RS-SINR measurements may be configured for all events A1-A6.

(5) A new trigger quantity and a threshold may be introduced to trigger the measurement report based on RS-SINR measurements.

(6) For reporting, the network may control whether the UE includes all measurement results (RSRP, RSRQ, SINR), or includes RSRP and RS-SINR measurements or includes RSRQ and RS-SINR measurements.

(7) A new filter coefficient for RS-SINR measurements in quantity configuration may be introduced.

(8) A range may be introduced for RS-SINR measurements.

On n RS-SINR measurements, intra-frequency RS-SINR may be measured on non-serving cells as well as serving cells, up to 8 intra-frequency cells, including the serving cell. Further, a number of cells for inter-frequency RS-SINR may be up to 4 cells per carrier. Table 1 shows a definition of RS-SINR.

TABLE 1

| | |
|---|---|
| Definition | RS-SINR is defined as the linear average over the power contribution (in [W]) of the resource elements carrying CRS divided by the linear average of the noise and interference power contribution (in [W]) over the resource elements carrying CRS within the considered measurement frequency bandwidth. For RS-SINR determination, the CRS $R_0$ shall be used. The reference point for the RS-SINR shall be the antenna connector of the UE. If receiver diversity is in use by the UE, the reported value shall not be lower than the corresponding RS-SINR of any of the individual diversity branches. |
| Applicable for | RRC_CONNECTED intra-frequency, RRC_CONNECTED inter-frequency |

As the network can operate in enhanced inter-cell interference coordination (eICIC) environments, the network may be configured with absolute blank subframe (ABS). If a UE is associated with a cell which are operating in ABS, restricted measurement may be configured. When restricted measurement is configured, at least one of the following options may be considered for interference measurements.

(1) RS-SINR measurements may be performed only within restricted measurement subframe.

(2) Regardless of restricted measurement subframe, RS-SINR measurements may always be performed in unrestricted subframe. If this options is used, interference may be fluctuated depending on how the UE selects resources for measurement. However, the UE may measure overall interference level regardless of ABS protection, and the overall interference level may be used to determine whether it is necessary to send the UE to different carrier or a cell.

(3) A network may configure which one to use between option (1) and option (2) described above. If the network configures to utilize restricted measurement, the UE may perform restricted RS-SINR measurements. Otherwise, the UE may perform unrestricted RS-SINR measurements. Or, the network may configure to report both, and in such case, the UE may perform both restricted and unrestricted RS-SINR measurements.

For determining whether the restricted measurement is configured or not, the UE may consider one of the following options.

(1) The UE may use the current configured restricted measurement subframe configuration. In this case, restricted measurement configuration used for RSRP/RSRQ measurements may be shared for RS-SINR measurements. In other words, RS-SINR can be also performed where RSRQ can be measured. In this case, the UE assume that if restricted measurement subframe is configured for RSRP/RSRQ measurements, it may also apply to RS-SINR measurements. In other words, the same restriction for measurement may be applied to RSRP/RSRQ and RS-SINR.

(2) Separate restricted measurement subframe configuration may be provided for RS-SINR measurements. In this case, similar to the current restricted measurement subframe configuration, 40 bits of restricted measurement subframe configuration for RS-SINR measurements may be provided. This restricted measurement subframe configuration for RS-SINR measurements may be generally used for other purposes to restrict RS-SINR measurements. For example, this restricted measurement subframe configuration for RS-SINR measurements may be used for restricting measurement alignment with discovery signal transmission.

In addition to restricted measurement, when a frequency is configured with discovery signal based measurement, some clarification of RS-SINR measurements may also be necessary. As legacy CRS is not available when discovery signal based measurement is configured in a frequency, at least one of the following options may be considered.

(1) RS-SINR measurements may be performed only on the activated serving cell. Alternatively, RS-SINR measurements may be performed only for frequency where discovery signal configuration is not given or activated serving cell. Alternatively, RS-SINR measurements may not configured with discovery signal configuration in a given frequency. If configured, the UE may assume misconfiguration.

(2) RS-SINR measurements may be performed based on CRS contained in discovery signal when the discovery signal is configured. In this case, if DRS measurement timing configuration (DMTC) is configured for a frequency, the UE may assume that RS-SINR is also measured based on discovery signal occasion per DMTC configuration. In other words, if DMTC is configured for a frequency, it may also apply to RSRP/RSRQ/RS-SINR.

(3) If CSI-RS is also configured in discovery signal, RS-SINR measurements based on CSI-RS may also be supported. In this case, two RS-SINR measurements may be supported, one of which is RS-SINR measurements based on CRS and the other is RS-SINR measurements based on CSI-RS. Alternatively, RS-SINR measurements based on CSI-RS may not be supported regardless of whether CSI-RS is configured in discovery signal. If RS-SINR measurements based on CSI-RS is supported, the result of RS-SINR measurements based on CSI-RS may be reported only when DRS-CSI-RS is configured and DMTC is configured. In this case, effective interference may not be measured as interference may not be present due to muting on DRS-CSI-RS. In that sense, as RSRP measurements based on CSI-RS is supported only, it may be desirable not to support RS-SINR measurements based on CSI-RS.

(4) Alternatively, separate configuration for RS-SINR measurements regarding cell on/off may be configured. That is, RSRP/RSRQ measurements based on discovery signal and RS-SINR measurements based on discovery signal may be separately configured. In this case, RS-SINR measurements based on discover signal may be configured per frequency and separate DMTC from RSRP/RSRQ measurements may be configured.

If the current configured restricted measurement subframe configuration is used for RS-SINR measurements for restricted measurement subframe configuration (i.e. option (1) regarding restricted measurement subframe configuration) and RS-SINR measurements may be performed based on CRS contained in discovery signal, the following Table 2 may be proposed for modified RS-SINR definition.

TABLE 2

| | |
|---|---|
| Definition | RS-SINR is defined as the linear average over the power contribution (in [W]) of the resource elements carrying CRS divided by the linear average of the noise and interference power contribution (in [W]) over the resource elements carrying CRS within the considered measurement frequency bandwidth.<br>For RS-SINR determination, the CRS R0 shall be used. If the UE can reliably detect that R1 is available, it may use R1 in addition to R0 to determine RS-SINR (this may not be applicable to RS-SINR, only use CRS port #0 instead).<br>The reference point for the RS-SINR shall be the antenna connector of the UE.<br>If receiver diversity is in use by the UE, the reported value shall not be lower than the corresponding RS-SINR of any of the individual diversity branches.<br>Alt 1) If only interference measurement is restricted, if higher-layer signalling indicates certain subframes for performing RS-SINR measurements, then linear average of the noise and interference power contribution is measured over all OFDM symbols in the indicated subframes.<br>Alt 2) If both signal measurement and interference measurement are restricted, if higher-layer signalling indicates certain subframes for performing RS-SINR measurements, then RS-SINR is measured over all OFDM symbols in the indicated subframes.<br>If higher layers indicate (RSRP/RSRQ) measurements based on discovery signals, the UE shall measure RS-SINR in the subframes in the configured discovery signal occasions. If the UE can reliably detect that cell-specific reference signals are present in other subframes, the UE may use those subframes in addition to determine RS-SINR. |
| Applicable for | RRC_IDLE intra-frequency,<br>RRC_IDLE inter-frequency,<br>RRC_CONNECTED intra-frequency,<br>RRC_CONNECTED inter-frequency |

FIG. 6 shows a method for performing RS-SINR measurements by a UE according to an embodiment of the present invention.

In step S100, the UE receives an indication of certain subframes for performing RS-SINR measurements from a network via a higher layer. The certain subframes may also be used for RSRP or RSRQ measurements.

In step S110, the UE performs the RS-SINR measurements in the certain subframes.

The RS-SINR measurements are performed over all OFDM symbols in the certain subframes. The RS-SINR measurements may be performed based on a CRS. The CRS may be contained in a discovery signal. The CRS may be received from the network on an antenna port 1, in addition to an antenna port 0. The RS-SINR measurements may be performed in the certain subframes in a discovery signal occasion if RSRP/RSRQ measurements based on a discovery signal is configured by the higher layer. The discovery signal occasion may be configured per DMTC.

FIG. 7 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a wireless device in a wireless communication system, the method comprising:

receiving, from a network, a first cell-specific reference signal (CRS) on an antenna port 0 and a second CRS on an antenna port 1;

receiving, from the network, information on certain subframes for performing reference signal signal-to-interference and noise ratio (RS-SINR) measurements via a higher layer signalling; and performing the RS-SINR measurements in the certain subframes based on the first CRS on the antenna port 0, wherein the second CRS on the antenna port 1 is unused for the RS-SINR measurements.

2. The method of claim 1, wherein the RS-SINR measurements are performed over all orthogonal frequency division multiplexing (OFDM) symbols in the certain subframes.

3. The method of claim 1, wherein the RS-SINR measurements are performed only in the certain subframes.

4. The method of claim 1, wherein the RS-SINR measurements are performed based on only the first CRS on the antenna port 0.

5. The method of claim 1, wherein the RS-SINR measurements are performed in the certain subframes in a discovery signal occasion, and
wherein a reference signal received power (RSRP) or a reference signal received quality (RSRQ) measurements based on a discovery signal is configured by the higher layer signalling.

6. The method of claim 5, wherein the discovery signal occasion is configured per discovery signal measurement timing configuration (DMTC).

7. The method of claim 1, wherein the certain subframes are used for RSRP or RSRQ measurements.

8. A wireless device in a wireless communication system, the UE comprising:
a memory;
a transceiver; and
at least one processor operatively coupled to the memory and the transceiver, wherein the at least one processor is configured to:
control the transceiver to receive, from a network, a first cell-specific reference signal (CRS) on an antenna port 0 and a second CRS on an antenna port 1,
control the transceiver to receive, from the network, information on certain subframes for performing reference signal signal-to-interference and noise ratio (RS-SINR) measurements via a higher layer signalling, and
perform the RS-SINR measurements in the certain subframes based on the first CRS on the antenna port 0, wherein the second CRS on the antenna port 1 is unused for the RS-SINR measurements.

9. The wireless device of claim 8, wherein the RS-SINR measurements are performed over all orthogonal frequency division multiplexing (OFDM) symbols in the certain subframes.

10. The wireless device of claim 8, wherein the RS-SINR measurements are performed only in the certain subframes.

11. The wireless device of claim 8, wherein the RS-SINR measurements are performed based on only the first CRS on the antenna port 0.

12. The wireless device of claim 8, wherein the RS-SINR measurements are performed in the certain subframes in a discovery signal occasion, and
wherein a reference signal received power (RSRP) or a reference signal received quality (RSRQ) measurements based on a discovery signal is configured by the higher layer signalling.

13. The wireless device of claim 12, wherein the discovery signal occasion is configured per discovery signal measurement timing configuration (DMTC).

14. The method of claim 1, wherein the RS-SINR measurements comprises measurements of an RS-SINR,
wherein the RS-SINR is defined as a linear average over a power contribution of resource elements carrying the first CRS on the antenna port 0 divided by a linear average of a noise and interference power contribution over resource elements carrying the first CRS on the antenna port 0,
wherein the linear average over the power contribution is measured over all orthogonal frequency division multiplexing (OFDM) symbols in a plurality of subframes,
wherein the linear average of the noise and interference power contribution is measured over all OFDM symbols in the certain subframes, and
wherein the certain subframes are restricted subframes that are part of the plurality of subframes.

15. The wireless device of claim 8, wherein the RS-SINR measurements comprises measurements of an RS-SINR,
wherein the RS-SINR is defined as a linear average over a power contribution of resource elements carrying the first CRS on the antenna port 0 divided by a linear average of a noise and interference power contribution over resource elements carrying the first CRS on the antenna port 0,
wherein the linear average over the power contribution is measured over all orthogonal frequency division multiplexing (OFDM) symbols in a plurality of subframes,
wherein the linear average of the noise and interference power contribution is measured over all OFDM symbols in the certain subframes, and
wherein the certain subframes are restricted subframes that are part of the plurality of subframes.

* * * * *